Patented Nov. 1, 1938

2,134,895

UNITED STATES PATENT OFFICE 2,134,895

CELLULOSE HYDROXY ETHERS

George W. Seymour and Victor Sluyty Salvin, Cumberland, Md., assignors to Celanese Corporation of America, a corporation of Delaware No Drawing. Application December 10, 1937, Serial No. 179,104

12 Claims. (Cl. 260—231)

This invention relates to the manufacture of cellulose hydroxy ethers by etherifying cellulose with an alkylene oxide in the presence of an inorganic base.

An object of the invention is the economic and expeditious method of producing cellulose hydroxy ethers. Another object of the invention is the method of producing cellulose hydroxy ethers by methods employing sodium hydroxide or the like wherein a substantial part of the sodium hydroxide or the like may be used over and over again. A still further object of the invention is the production of cellulose hydroxy ethers by a method that produces a very small amount of glycol or polyglycols, thus effecting an economy in the amount of alkylene oxide employed and also producing a harder, tougher product. A further object of the invention is the production of a cellulose hydroxy ether that is neutral and, therefore, one which may be employed as a size or coating on organic ester of cellulose fiber, film, filaments or fabrics without effecting a saponification or other permanent modification thereof. Still another object of the invention is the process of making cellulose hydroxy ethers which may be formed into clear solutions and which when cast upon a surface or otherwise formed into a sheet produces tough, clear, non-abrasive films. Other objects of the invention will appear from the following detailed description.

It is known that ethers may be formed by reacting soda-cellulose with alkylene oxides. The methods employed prior to this invention, however, were costly in that they required large amounts of sodium hydroxide and alkylene oxide. Also, by the methods employed prior to this invention, very costly purification steps were necessary to remove the large amount of glycols, polyglycols, inorganic salts and the like that were formed during the etherification. Small amounts of the polyglycols are not detrimental. However, such compounds not only have a softening action on cellulose hydroxy ethers but also effect a change in the solubility thereof. Therefore, any substantial amount of polyglycols are detrimental to many uses to which the cellulose hydroxy ether may be put. Furthermore, the polyglycols are formed by a reaction involving the alkylene oxides, and their formation, therefore, consumes a substantial amount of the costly alkylene oxide.

We have now found that a large part of the sodium hydroxide can be used over and over again by a step involving the concentration of the caustic on the cellulose fiber by expressing the liquid from the cellulose fiber. I have also found that the production of by-products that involve the use of the alkylene oxide, such as the formation of glycols and polyglycols, may be reduced to a minimum by a step involving the regulation of the ratio of water to cellulose.

After the etherification of the cellulose to cellulose hydroxy ethers, these ethers are contaminated with sodium hydroxide or other caustic employed in forming the alkali-cellulose. The caustic can be formed into a salt by adding boric acid to the material and allowing the comparatively large crystals of sodium borate to form and then filtering these out. This does not remove all of the sodium borate, however, and there remains in the cellulose hydroxy ether sometimes as high as 5 to 10% by weight of the sodium borate.

We have also found that a cellulose hydroxy ether that is non-injurious to organic derivatives of cellulose, such as cellulose acetate, may be produced by a final step which comprises neutralizing the retained sodium borate with an inorganic or, more preferably, an organic acid. For instance, the neutralizing of the sodium borate with acetic acid effects a change in the composition such that no crystals form in films cast from the cellulose hydroxy ethers.

In accordance with our invention we produce cellulose hydroxy ethers by etherifying alkali-cellulose with an alkylene oxide in the presence of a small amount of water. The ratio of water to cellulose should be less than 1.50 and preferably less than 1.10 but above 0.60, which proportions effect the production of cellulose hydroxy ether having an ether value of above 1.75 ether groups for each $C_6H_{10}O_5$ group present in the cellulose molecule. After etherification water is added to form a solution of the cellulose hydroxy ether and then the alkali employed is formed into a salt by the addition of boric acid. The solution is allowed to stand for a few hours until the relatively large crystals of the alkali-borate are formed and these are filtered out of the solution. We prefer to neutralize the remaining sodium borate in the solution with an organic acid. If a purer form of the cellulose hydroxy ether is desired we purify the same by beating the above solution into acetone thus precipitating the cellulose hydroxy ether as a fibrous material. This fibrous material is then washed with a mixture of acetone and methyl or ethyl alcohol, which step removes the larger part of the polyglycol and reduces the amount of the sodium borate and organic-alkali salt retained on the fibrous material to a minimum.

The cellulosic material to be etherified may be any suitable cellulose or its near conversion products. For example, the cellulosic material may be cotton, cotton linters, wood pulp, regenerated or reconstituted cellulose made by the viscose or cupammonium method or other cellulosic material. The cellulose to be treated may be in the form of fibers, felts, tissue, crumbs and the like or it may be in the form of filaments, films, foils or fabrics.

The cellulosic material is formed into an alkali-cellulose by treating the cellulose with a suitable alkali. Although any alkali may be employed, we prefer to use sodium hydroxide. We have found that the amount of caustic absorbed by the cellulosic material and the degree of swelling of the cellulosic material vary with the concentration of the caustic solution. Low concentrations produce a hard, flaky alkali-cellulose, while high concentrations produce alkali-celluloses which are etherified only with great difficulty and cause fast degradation of the cellulose molecule. We have found that the concentration of sodium hydroxide producing a particle of the fluffy and porous nature best suited for uniformity of chemical reaction is a sodium hydroxide solution of a concentration between 17.9 and 18.5. It is also desirable to steep the cellulose in a bath of alkali which is from 25 to 40 times the weight of the cellulose. As sodium hydroxide is the preferred caustic material, the invention will be described with respect to the use of that material, it being understood that its equivalent of any other of the alkalies may be employed.

The soda-cellulose produced by treating the cellulosic material with say an 18% sodium hydroxide solution contains far too much water. It is, therefore, necessary to reduce the amount of water and also to concentrate the caustic in or on the fiber of the cellulose. This is best accomplished by pressing the cellulose fiber to squeeze out the water contained. We have found that if this pressing out of the water is done in two steps a considerable quantity of the sodium hydroxide can be used over and over again without any chemical purification or reconcentration. For instance, if the soda-cellulose is placed in a press and subjected to 300 pounds per square inch of pressure for a period of from 5 to 30 minutes, substantially ¾ of the sodium hydroxide solution employed is expressed and is of the same concentration as it was when it was applied to the cellulosic material. The remaining part of the liquid is then pressed out of the cellulosic material at a pressure of above 2,500 pounds per square inch, which pressure is maintained for from ½ hour to 5 hours or more. The liquid pressed from the cellulosic material in the second operation contains from 16 to 17.1% of sodium hydroxide as well as a small amount of hemi-cellulose. The liquid from the second pressing needs purification and reconcentrating before it can be used again for forming soda cellulose. The pressure in all cases should be of such degree and duration that the ratio of water to cellulose is less than 1.50 and preferably between 1.10 and 0.6. Lower concentrations of water are inadvisable for the reason that the use of such concentrations will cause dry caustic soda to crystallize out on the surface of the cellulosic material. This dry caustic soda effects a polymerization of the alkylene oxide which forms at the surface of the fiber, thus effecting a sealing of the fiber surface and preventing an etherification of the center of the fiber.

The purpose in keeping the water content low is to control the quantity of polyglycols formed. Although the alkylene oxide requires some water to form polyglycols, the presence of the water is not the immediate cause for their formation. The quantity of water present determines the character of the soda-cellulose and hence its reactivity and also the quantity of polyglycols formed. There is apparently a diversion of a small amount of the alkylene oxide to polyglycols during the entire reaction. The rate is constant, however, for a reactive soda-cellulose up to the point where 2 to 2.5 mols of alkylene oxide have been added. Above this point the amount of diversion increases sharply. When a quantity of water above 1.5 ratio of water to cellulose is present the physical characteristics of the reaction mass changes. When larger quantities of water are present the cellulose ether goes into solution in the water present and forms a film on the outside of the particles. This film prevents contact with the alkylene oxide of the unreacted soda-cellulose and diverts a greater portion to polyglycols.

The pressed block of soda-cellulose may be ground, milled, torn or otherwise divided into a particle size suitable for etherification. The grinding is performed under regulated conditions as to temperature and exposure. Localized overheating is to be avoided and the mass temperature is preferably below 18° C., say 0° to 10° C. Prolonged grinding with exposure to the air should also be avoided as the soda-cellulose becomes degraded after a short time of ripening. Any suitable alkylene oxide is then brought into contact with the soda-cellulose, the reaction producing a cellulose hydroxy ether. Any suitable alkylene oxide such as ethylene oxide, butylene oxide, etc. may be employed in accordance with this invention. The amount of alkylene oxide employed in the reaction will depend upon the number of ether groups to be introduced into the cellulose molecule. The conditions of temperature and pressure under which etherification takes place also regulates the number of alkylene oxide radicals introduced into the cellulose molecule. The best results are obtained when the etherification is effected while maintaining the temperature at less than 30° C., say 16 to 30° C., and adding the alkylene oxide at a very slow rate. Too low a temperature should be avoided as the cellulose becomes soluble in the caustic solution at the lower temperatures. Moreover, lower temperatures tend to produce a larger quantity of degraded materials. The alkylene oxide is preferably added to the cellulose at a rate of less than one pound per hour and the system is preferably maintained under a pressure below atmospheric pressure. When employing ethylene oxide as the etherifying agent it is preferable to introduce the same to the cellulose at less than 0.5 of a pound per hour.

The reaction products from the etherifying step may be set aside to ripen to any desired viscosity. It is preferable to maintain the temperature during ripening at about 26° C. Also, it is preferable to ripen the cellulose hydroxy ether in substantially air-tight containers whereby a slower but more uniform ripening is effected than when the cellulose hydroxy ether is ripened while exposed to the air. Water is added to the ripened cellulose hydroxy ether and the mother liquor so as to form about a 20% solution of the cellulose hydroxy ether in water. A calculated quantity of boric acid is added to convert all of the sodium hydroxide present in the cellulose hydroxy ether solution to sodium borate. The solution is then chilled to about 12° C. and allowed to stand for several hours to allow the formation of large sodium borate crystals. By filtering the solution a large proportion of the sodium borate crystals may be removed. Canvas or other cotton fabric may be used as the filter medium. The filtered solution may contain 1.5% by weight/volume of dissolved sodium borate or about 7% by weight of the total solids. This alkaline borate (pH 9.5) may cause saponification if the cellulose hydroxy ether is employed as a coating on cellulose acetate yarns as well as affects its dyeing properties. As one of the largest uses is as a size for warp yarns, it is necessary that it form a tough, homogeneous, hard film. When the films are formed the sodium borate tends to crystallize out leaving large, sharp projecting sodium borate crystals in the film. We have found, however, that if the sodium borate is neutralized with an acid the films formed from the cellulose hydroxy ether solution do not have the sharp, abrasive crystals. For example, if the sodium borate in the solution is neutralized with sulphuric acid a film formed from the solution contains sodium sulphate crystals which are not nearly so abrasive as the sodium borate crystals, while if the sodium borate is neutralized with acetic acid or other organic acid no crystals appear in the film and the film is clear, hard and strong. Conversion of the sodium borate to boric acid prevents crystallization of the sodium borate and gives slightly softer films when a high percentage of hygroscopic polyglycols are present, sufficient water being retained in the film to prevent crystallization of sodium sulphate. With filaments of low polyglycol content, however, the sodium sulphate in the film formed therefrom crystallizes out and the film strength is weakened. In using an organic acid to neutralize the sodium borate, clear, flexible films are obtained regardless of the polyglycol content. Accordingly, neutralizing the sodium borate with an organic acid produces a cellulose hydroxy ether solution most suitable for forming sizing solutions to be applied to warps. The hydroxy acids are found to be superior for neutralizing the sodium borate since these acids form more hygroscopic salts and tend to produce softer films free from crystals. Examples of suitable hydroxy acids are glycolic acid, tartaric acid, citric acid, etc. When employing these acids any residual moisture held by the film tends to inhibit crystallization.

For the purpose of forming filaments and yarns a purer cellulose hydroxy ether is necessary than for its use as a size. To obtain a purer cellulose hydroxy ether, i. e. to reduce the polyglycol and sodium borate content thereof, the 20% solution, formed by dissolving the etherifying mixture in water, is whipped into acetone whereby the cellulose hydroxy ether is precipitated in the form of fibers. The acetone and water is then drained from the fibers and the fibers are washed several times with a mixture of acetone and methyl or ethyl alcohol. The alcohol may contain some water or a small amount of water may be added to the mixture sufficient to dissolve some of the sodium borate without dissolving any substantial amount of the cellulose hydroxy ether.

As stated above, the cellulose hydroxy ether prepared as above is useful in the sizing of warps formed of any type of yarn. However, it is especially useful in sizing warps formed from yarns containing organic derivatives of cellulose to which the ordinary gelatin sizes do not readily adhere, whereas the cellulose hydroxy ether sizes do. The size may be formed by dissolving the cellulose hydroxy ether in from 1 to 10 times its weight of water to which may or may not be added a small percentage, say 1 to 10% on the weight of the solids, of glycerine, glycol, etc. Also, if desired, magnesium chlorate or other inorganic electrolyte may be added to the size. This size may be applied to warps formed of cellulose acetate, which warps have been lubricated with olive oil or a mixture of oils and sulphonated fatty alcohols in an amount equal to from 2 to 5%, based on the weight of the warp. The temperature of application may vary between 140 to 170° C.

As an illustration of this invention, but without being limited thereto, the following example is given:

*Example*

17.5 pounds of wood pulp sheets are loosely packed with spaced edges in the compartment of a viscose horizontal steeping press. To this wood pulp is added 550 pounds of an 18% sodium hydroxide solution. The steeping liquor is pre-cooled such that it reaches the equilibrium temperature of 15 to 18° C. with the press and the cellulose. The cellulose is steeped for 1 to 2 hours. At the end of steeping the liquor is drained off and returned to the original storage tank. More liquor is pressed out under low pressure (0 to 500 pounds) and this is also returned to the original storage tank, the total recovery here being about 470 pounds of substantially 18% sodium hydroxide solution. The pressure in the press is then raised to about 3,000 pounds per square inch and maintained at that pressure for about 1½ to 3 hours. The liquor from this second pressing amounts to about 35 pounds and contains 17.4% sodium hydroxide and 1.37% of hemi-cellulose. This material may be discarded or sent to a purification and reconcentrating plant.

The pressed cake is then ground to crumbs at about 10% C. and without exposing the same to the air for more than 24 hours, as longer periods of exposure tend to reduce the viscosity of the soda-cellulose and also the ether formed from the same. When the viscosity of the cellulose hydroxy ether is reduced in this manner a uniform cellulose hydroxy ether is not produced.

The crumbs of soda-cellulose are then placed in a stainless steel rotating drum fitted with a water jacket, vacuum connection and an inlet for ethylene oxide from a pressure container. The drum is charged with between 40 and 45 pounds of alkali-cellulose and gaseous ethylene oxide is admitted at a rate of 0.4 pound per hour to the drum. Immediate reaction of the ethylene oxide maintains the vacuum of 20 to 22 inches of mercury. The reaction evolves heat and may be kept at 30° C. by regulating the temperature of water in the jacket. The alkali-cellulose from 17.5 pounds of wood pulp will react with 15 pounds of ethylene oxide (3.5 moles per $C_6H_{10}O_5$ molecule of cellulose) in 44 hours. By regulating the amount of ethylene oxide introduced as well as the temperature at which it is introduced there may be formed a cellulose hydroxy ether having any desired ether value. Sufficient of the ethylene oxide is added to produce a cellulose hydroxy ether having between 1.75 and 2 ether groups for each six carbon atoms present in the cellulose molecule.

The cellulose hydroxy ether with the mother liquors (45 to 50% by weight of water) are then placed in iron or stainless steel cans provided with lids and allowed to stand at about 26° C. for 96 hours after which time a cellulose hydroxy ether is formed, a 10% solution of which has a 20 Ostwald viscosity. The material from the ripening cans are dissolved in water to form a 20% solution thereof and sufficient boric acid added to neutralize the sodium hydroxide. After standing two hours at about 16° C. the material is filtered through canvas to remove the larger crystals of sodium borate. Sufficient acetic acid is then added to bring the solution neutral to litmus.

It is to be understood that the foregoing detailed description is merely given by way of illustration and that many variations may be made without departing from the spirit of our invention.

Having described our invention, what we desire to secure by Letters Patent is:

1. In a process for the preparation of cellulose hydroxy ethers comprising the reacting of an alkali cellulose with an alkylene oxide, the steps of steeping cellulose in from 25 to 40 times its weight of an alkali hydroxide of a concentration equal to 17.9% to 18.5% of caustic soda, reducing the ratio of water to cellulose to between 0.60 and 1.50 by weight, adding an alkylene oxide to form a cellulose hydroxy ether, dissolving the reaction product in water, adding sufficient boric acid to form the alkali borate, allowing large crystals of alkali borate to form, filtering out a substantial part of the alkali borate and neutralizing the remaining alkali borate with an acid.

2. In a process for the preparation of cellulose hydroxy ethers comprising the reacting of an alkali cellulose with an alkylene oxide, the steps of steeping cellulose in from 25 to 40 times its weight of an alkali hydroxide of a concentration equal to 17.9% to 18.5% of caustic soda, reducing the ratio of water to cellulose to between 0.60 and 1.50 by weight, adding an alkylene oxide to form a cellulose hydroxy ether, dissolving the reaction product in water, adding sufficient boric acid to form the alkali borate, allowing large crystals of alkali borate to form, filtering out a substantial part of the alkali borate and neutralizing the remaining alkali borate with acetic acid.

3. In a process for the preparation of cellulose hydroxy ethers comprising the reacting of an alkali cellulose with an ethylene oxide, the steps of steeping cellulose in from 25 to 40 times its weight of an alkali hydroxide of a concentration equal to 17.9% to 18.5% of caustic soda, reducing the ratio of water to cellulose to between 0.60 and 1.50 by weight, adding an ethylene oxide to form a cellulose hydroxy ether, dissolving the reaction product in water, adding sufficient boric acid to form the alkali borate, allowing large crystals of alkali borate to form, filtering out a substantial part of the alkali borate and neutralizing the remaining alkali borate with an acid.

4. In a process for the preparation of cellulose hydroxy ethers comprising the reacting of an alkali cellulose with an ethylene oxide, the steps of steeping cellulose in from 25 to 40 times its weight of an alkali hydroxide of a concentration equal to 17.9% to 18.5% of caustic soda, reducing the ratio of water to cellulose to between 0.60 and 1.50 by weight, adding an ethylene oxide to form a cellulose hydroxy ether, dissolving the reaction product in water, adding sufficient boric acid to form the alkali borate, allowing large crystals of alkali borate to form, filtering out a substantial part of the alkali borate and neutralizing the remaining alkali borate with acetic acid.

5. In a process for the preparation of cellulose hydroxy ethers comprising the reaction of a soda cellulose with an alkylene oxide, the steps of steeping cellulose in an aqueous solution of caustic soda having a concentration of between 17.9 to 18.5, reducing the ratio of water to cellulose to between 0.60 and 1.50 by weight, adding an alkylene oxide to form a cellulose hydroxy ether, dissolving the reaction product in water, adding sufficient boric acid to form sodium borate, conditioning the solution to form large crystals of sodium borate, filtering out a substantial part of the sodium borate and neutralizing the remaining sodium borate with an acid.

6. In a process for the preparation of cellulose hydroxy ethers comprising the reaction of a soda cellulose with an alkylene oxide, the steps of steeping cellulose in an aqueous solution of caustic soda having a concentration of between 17.9 to 18.5, reducing the ratio of water to cellulose to between 0.60 and 1.50 by weight, adding an alkylene oxide to form a cellulose hydroxy ether, dissolving the reaction product in water, adding sufficient boric acid to form sodium borate, conditioning the solution to form large crystals of sodium borate, filtering out a substantial part of the sodium borate and neutralizing the remaining sodium borate with acetic acid.

7. In a process for the preparation of cellulose hydroxy ethers comprising the reaction of a soda cellulose with an ethylene oxide, the steps of steeping cellulose in an aqueous solution of caustic soda having a concentration of between 17.9 to 18.5, reducing the ratio of water to cellulose to between 0.60 and 1.50 by weight, adding an ethylene oxide to form a cellulose hydroxy ether, dissolving the reaction product in water, adding sufficient boric acid to form sodium borate, conditioning the solution to form large crystals of sodium borate, filtering out a substantial part of the sodium borate and neutralizing the remaining sodium borate with an acid.

8. In a process for the preparation of cellulose hydroxy ethers comprising the reaction of a soda cellulose with an ethylene oxide, the steps of steeping cellulose in an aqueous solution of caustic soda having a concentration of between 17.9 to 18.5, reducing the ratio of water to cellulose to between 0.60 and 1.50 by weight, adding an ethylene oxide to form a cellulose hydroxy ether, dissolving the reaction product in water, adding sufficient boric acid to form sodium borate, conditioning the solution to form large crystals of sodium borate, filtering out a substantial part of the sodium borate and neutralizing the remaining sodium borate with acetic acid.

9. In a process for the preparation of cellulose hydroxy ethers comprising the reacting of an alkali cellulose with an alkylene oxide, the steps of steeping cellulose in from 25 to 40 times its weight of an alkali hydroxide of a concentration equal to 17.9% to 18.5% of caustic soda, reducing the ratio of water to cellulose to between 0.60 and 1.50 by weight, adding an alkylene oxide to form a cellulose hydroxy ether, dissolving the reaction product in water, adding sufficient boric acid to form the alkali borate, whipping the solution into acetone to precipitate the cellulose hydroxy ether and washing the precipitated cellulose hydroxy ether with a mixture of acetone and alcohol.

10. In a process for the preparation of cellulose hydroxy ethers comprising the reacting of an alkali cellulose with an alkylene oxide, the steps of steeping cellulose in from 25 to 40 times its weight of an alkali hydroxide of a concentration equal to 17.9% to 18.5% of caustic soda, reducing the ratio of water to cellulose to between 0.60 and 1.50 by weight, adding an alkylene oxide to form a cellulose hydroxy ether, dissolving the reaction product in water, adding sufficient boric acid to form the alkali borate, whipping the solution into acetone to precipitate the cellulose hydroxy ether and washing the precipitated cellulose hydroxy ether with a mixture of acetone, alcohol and a small amount of water.

11. In a process for the preparation of cellulose hydroxy ethers comprising the reacting of an alkali cellulose with an ethylene oxide, the steps of steeping cellulose in from 25 to 40 times its weight of an alkali hydroxide of a concentration equal to 17.9% to 18.5% of caustic soda, reducing the ratio of water to cellulose to between 0.60 and 1.50 by weight, adding an ethylene oxide to form a cellulose hydroxy ether, dissolving the reaction product in water, adding sufficient boric acid to form the alkali borate, whipping the solution into acetone to precipitate the cellulose hydroxy ether and washing the precipitated cellulose hydroxy ether with a mixture of acetone and alcohol.

12. In a process for the preparation of cellulose hydroxy ethers comprising the reaction of a soda cellulose with an alkylene oxide, the steps of steeping cellulose in an aqueous solution of caustic soda having a concentration of between 17.9 to 18.5, reducing the ratio of water to cellulose to between 0.60 and 1.50 by weight, adding an alkylene oxide to form a cellulose hydroxy ether, dissolving the reaction product in water, adding sufficient boric acid to form sodium borate, whipping the solution into acetone to precipitate the cellulose hydroxy ether and washing the precipitated cellulose hydroxy ether with a mixture containing acetone and alcohol.

GEORGE W. SEYMOUR.
VICTOR SLUYTY SALVIN.